United States Patent [19]

Kwech

[11] Patent Number: 5,429,456
[45] Date of Patent: Jul. 4, 1995

[54] APPARATUS AND METHOD FOR MACHINING SEATS OF GATE VALVES

[75] Inventor: Horst Kwech, Lake Bluff, Ill.

[73] Assignee: Westinghouse Elec Corp, Pittsburgh, Pa.

[21] Appl. No.: 241,190

[22] Filed: May 11, 1994

[51] Int. Cl.$^6$ .......... B23B 35/00; B23B 41/00
[52] U.S. Cl. .......... 408/1 R; 408/79; 408/83.5
[58] Field of Search .......... 408/1 R, 79, 80, 83.5, 408/113, 124, 129, 137, 153, 181; 82/1.2, 172

[56] References Cited

U.S. PATENT DOCUMENTS

| | | | |
|---|---|---|---|
| 4,114,483 | 9/1978 | Grimsley | 82/1.2 |
| 4,175,471 | 11/1979 | Wilger et al. | 408/83.5 |
| 4,241,623 | 12/1980 | Wilger et al. | 74/765 |
| 4,468,158 | 8/1984 | Pearce et al. | 408/16 |
| 4,580,931 | 4/1986 | Wilger et al. | 408/72 |
| 4,842,452 | 6/1989 | Strait | 408/80 |
| 5,125,299 | 6/1992 | Strait | 408/83.5 |

Primary Examiner—Daniel W. Howell

[57] ABSTRACT

Apparatus for machining the annular valve seats of a gate valve has a cradle which slides on and wedges outward against the confronting gate guide rails in the valve chamber to lock the cradle in place between the valve seats. A large gear is mounted on one side of the cradle for rotation by a hydraulic motor about an axis generally aligned with the axis of the facing valve seat through adjustment of a pair of leveling screws. A carriage is driven axially on guide rods projecting from the gear adjacent the periphery thereof by a servo motor mounted in the plane of the gear. A tool carrier is reciprocated radially on slides on the carriage by a lead screw motor mounted on the carriage. When machining of one valve face is completed, the cradle is unlocked, lifted off the guide rails, rotated 180° about a vertical axis and reinstalled on the guide rails for machining of the other valve seat.

11 Claims, 7 Drawing Sheets

APPARATUS AND METHOD FOR MACHINING SEATS OF GATE VALVES

BACKGROUND OF THE INVENTION

1. Field of the Invention

This invention relates to an apparatus and method for machining the annular seats of gate valves, and in particular, to such an apparatus and method which utilizes the gate guide rails inside the valve chamber for fixturing.

2. Background of Information

A gate valve has two confronting annular seats and a gate which slides on a pair of guides cast or welded on opposite sides of a valve chamber midway between the seats. The gate is operated manually or by an actuator between an open position and a closed position in which disks on the gate seat against the two annular valve seats. The annular valve seats and the gate disks are tilted at the same small angle from the axis through the valve to facilitate seating of the disks against the valve seats.

There are many applications where gate vanes are used. One such application is in nuclear power plants. Many such valves in nuclear power plants have satellite hard facing material on the valve seats. The satellite contains cobalt which becomes activated by the radioactive coolant which passes through the valves. Removing the satellite hard facing in situ has been a difficult and time consuming process which exposes workers to radiation. Current practice has been to cut out the valves and remove them to other facilities where the satellite hard facing is removed and replaced by a stainless steel overlay. The stainless steel overlay is laid down by a weld which must then be machined.

Removal of the gate valve from the piping system for refurbishing is expensive and time consuming. There is a need, therefore, for apparatus which can machine seats of gate valves without removing the valves from the installation.

There is a further need for such apparatus which requires minimum operator presence to reduce radiation exposure.

SUMMARY OF THE INVENTION

These and other needs are satisfied by the invention which is directed to apparatus and a method for machining the valve seats in gate valves in which a cradle engages the gate guide rails to position the cradle in front of the valve seats. Means are then mounted on the cradle for machining the valve seats. The cradle includes slides which engage the guide rails and locking means in the form of wedges which wedge outward and clamp the cradle between the confronting guide rails.

Leveling means, preferably in the form of a pair of spaced apart threaded rods extend downward from the cradle and contact the bottom of the valve chamber to adjust the height of the cradle to align the axis of the machining means with the axis of the valve seat.

The means mounted on the cradle for machining the valve seats comprises a first means mounted on the cradle for rotation about a first axis generally coincident with the axis of the annular valve seat, second means moveable axially toward and away from the valve seat, and third means radially moveable relative to the axis of the valve seat.

The first means is a rotatable member, and preferably a gear mounted for rotation about the first axis, and first motive means rotating the gear about the first axis. The second means includes guide members mounted adjacent the periphery of the rotatable member, a carriage moveable on the guide members, and second motive means moving the carriage axially along the guide members. The third means comprises slide members on the carriage extending radially with respect to the axis of the annular valve seat, a tool carrier slidable on the slide members and third motive means for sliding the tool carrier radially on the slide members.

The apparatus is quickly and easily installed in the valve by removing the gate and sliding the cradle onto the gate guide rails. The height of the gate is set by the leveling screws and then the wedges are tightened to clamp the cradle rigidly in place between the valve seats. Once so installed, the apparatus can be operated remotely. The carriage is moved axially to bring the tool toward the valve seat and the tool carrier is positioned radially on the valve seat. The gear is then rotated to machine the valve seat with axial feeding through movement of the carriage and radial advancement of the tool carrier as needed to machine the valve seat. When the machining is completed, the wedges are backed-off and the entire mechanism is lifted out, turned 180° and reinserted for machining of the other valve seat. The first axis of the gear is offset to align with the axes of the valve seats.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
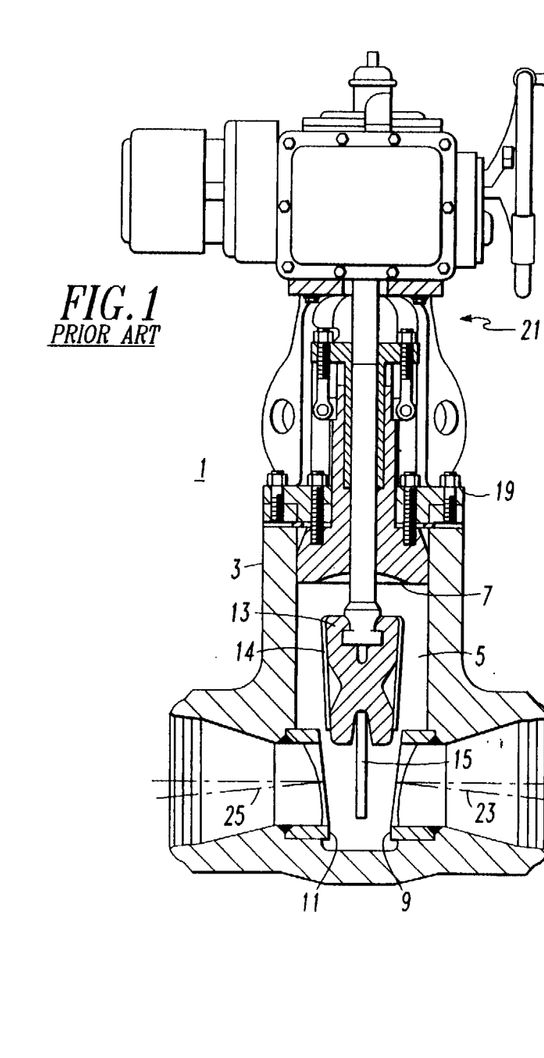
FIG. 1 is a longitudinal vertical section through a gate valve.
Figure 2:
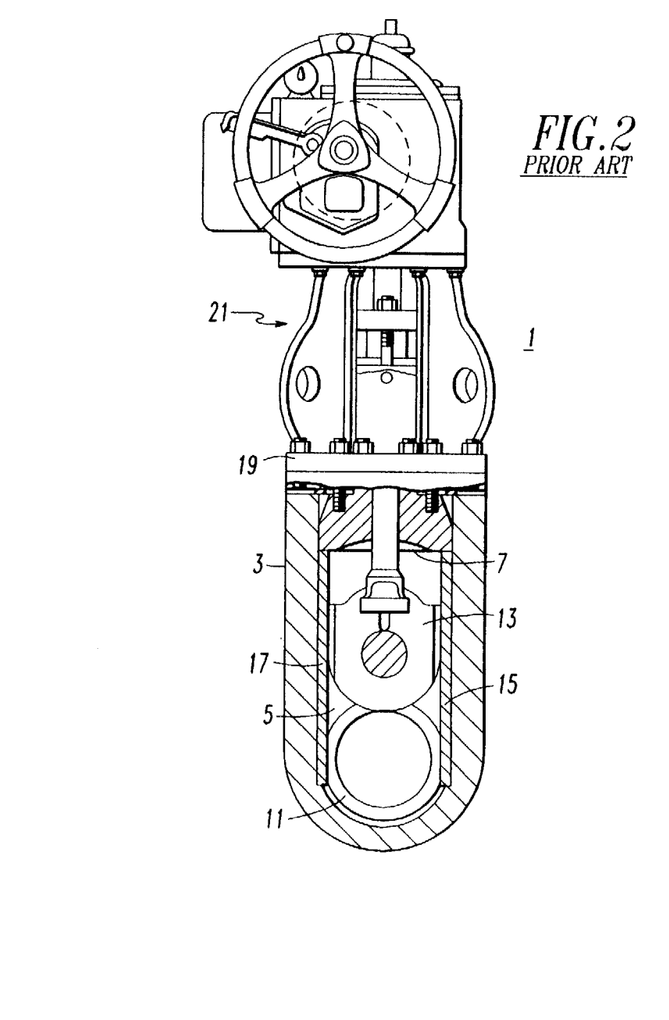
FIG. 2 is a transverse vertical section through the gate valve of FIG. 1.
Figure 3:
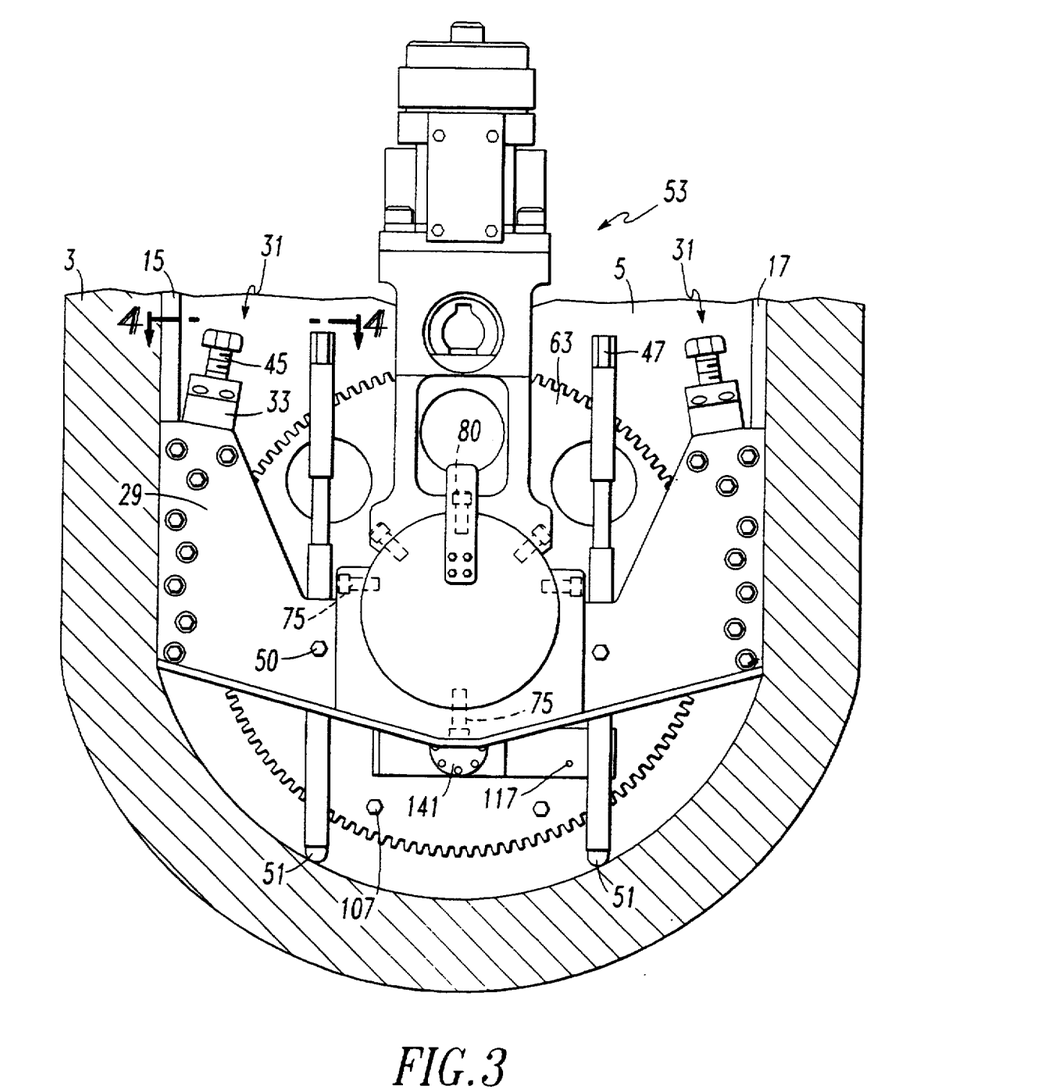
FIG. 3 is a rear elevation of the apparatus of the invention shown installed in the gate valve of FIGS. 1 and 2.

Referring to FIGS. 1 and 2, there is shown a gate valve 1 having a valve body 3 with a valve chamber 5, accessible through a valve throat 7. Within the valve chamber 5 are a pair of confronting annular valve seats 9 and 11. A gate 13 is slidable on confronting guide rails 15 and 17 on opposite sides of the valve chamber between the valve seats 9 and 11. The valve throat is closed by a valve cap 19. A valve operator 21 extends and retracts the gate 13 along the guide rails 15 and 17 to close and open the gate valve 1. It will be noted that the axis 23 of the valve seat 9 is not coincident with the axis 25 of the valve seat 11. These axes 23 and 25 are offset about 5° from the horizontal, and the disks 14 of the gate 13 are similarly inclined with the vertical so that they seat uniformly on the valve seats 9 and 11 when the gate is fully inserted.

Figure 4:
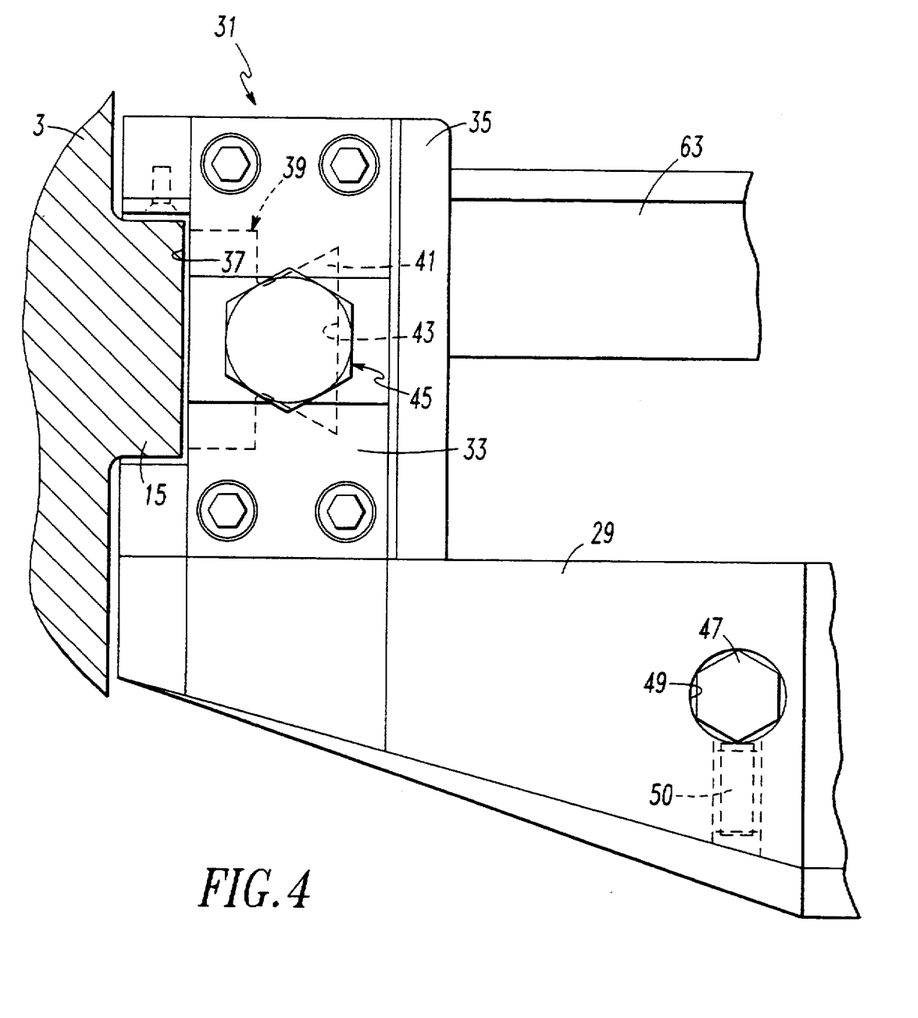
FIG. 4 is a fractional top plan view taken along the lines 4—4 in FIG. 3 in enlarged scale.

Turning to FIGS. 3–10, the apparatus 27 for machining the valve seats 9 and 11 includes a cradle 29 which is inserted through the valve throat 7 into the valve chamber 5. A pair of locking devices 31 on each end of the cradle engage and slide along the guide rails 15 and 17. As best seen in FIG. 4, the locking devices 31 include a slide bridge 33 and a mounting rail 35 forming a recess 37 which engages the guide rail 15 or 17. A shim 38 secured by a fastener 40 accommodates for different sized rails 15 and 17. A wedge 39 has a dovetail 41 which slides within a mortise 43 in the mounting rail 35. A wedge adjustment screw 45 threaded through the slide bridge 33 engages the wedge 39 and when rotated urges the wedge outward to tightly wedge the cradle between the confronting guide rails 15 and 17. A pair of elongated leveling screws 47 are threaded through spaced apart bores 49 in the cradle 29. The leveling screws 47 have hemispherical feet 51 which bear against the bottom of the valve chamber 5. Adjustment of the leveling screws 47 aligns the apparatus vertically with the annular valve seats 9 and 11. The settings of the leveling screws are maintained by set screws 50.

The cradle 29 supports a device 53 for machining the valve seats 9 and 11. The machining device 53 machines one valve seat at a time. The entire apparatus 27 is then lifted out of the valve chamber 5, rotated 180° about a vertical axis, and reinserted for machining the other valve seat. Accordingly, the apparatus 27 will be described in detail only in connection with machining the valve seat 9, but it will be understood therefrom the similar manner in which the valve seat 11 is machined.

The machining device 53 includes a first mechanism 55 which rotate about an axis 57 which is generally concentric with the axis 23 of the valve seat 9. The machine device 53 includes a second mechanism 59 which is moveable generally axially with respect to the axis 23 of the valve seat and a third mechanism 61 which is moveable radially with respect to the axis 23.

The first mechanism 55 includes a rotatable member in the form of a gear 63. A hub 65 secured to the gear 63 by bolts 67 is journaled in a pair of roller bearings retained on the hub by a bearing nut 71 and supported in a bearing housing 73 which is secured to the cradle 29 by bolts 75. The bearing housing 73 is secured in the cradle 29 at an angle to the horizontal so that the first axis 57 of the gear 63 is generally coincident with the axis 23 of the valve seat 9.

The first mechanism 55 also includes a drive assembly 77 for rotating the gear 63. This drive assembly 77 includes a drive housing 79 bolted to the top of the bearing housing 73 by bolts 80. A hydraulic motor 81 is mounted on top of the housing 79 and is controlled by a valve 83 connected to a source of pressurized hydraulic fluid (not shown). A bevel gear 85 on the output shaft 87 of the hydraulic motor 81 engages a bevel gear 89 on a drive shaft 91 which is supported by a pair of ball bearings 93 mounted in the drive housing 79. A pinion gear 95 on the drive shaft 91 engages the peripheral teeth 97 on the gear 63. A resolver 99 tracks the rotation of the drive shaft 91 and therefore the gear 63. A junction box 101 houses the controls for operation of the hydraulic motor 81.

Figure 5:
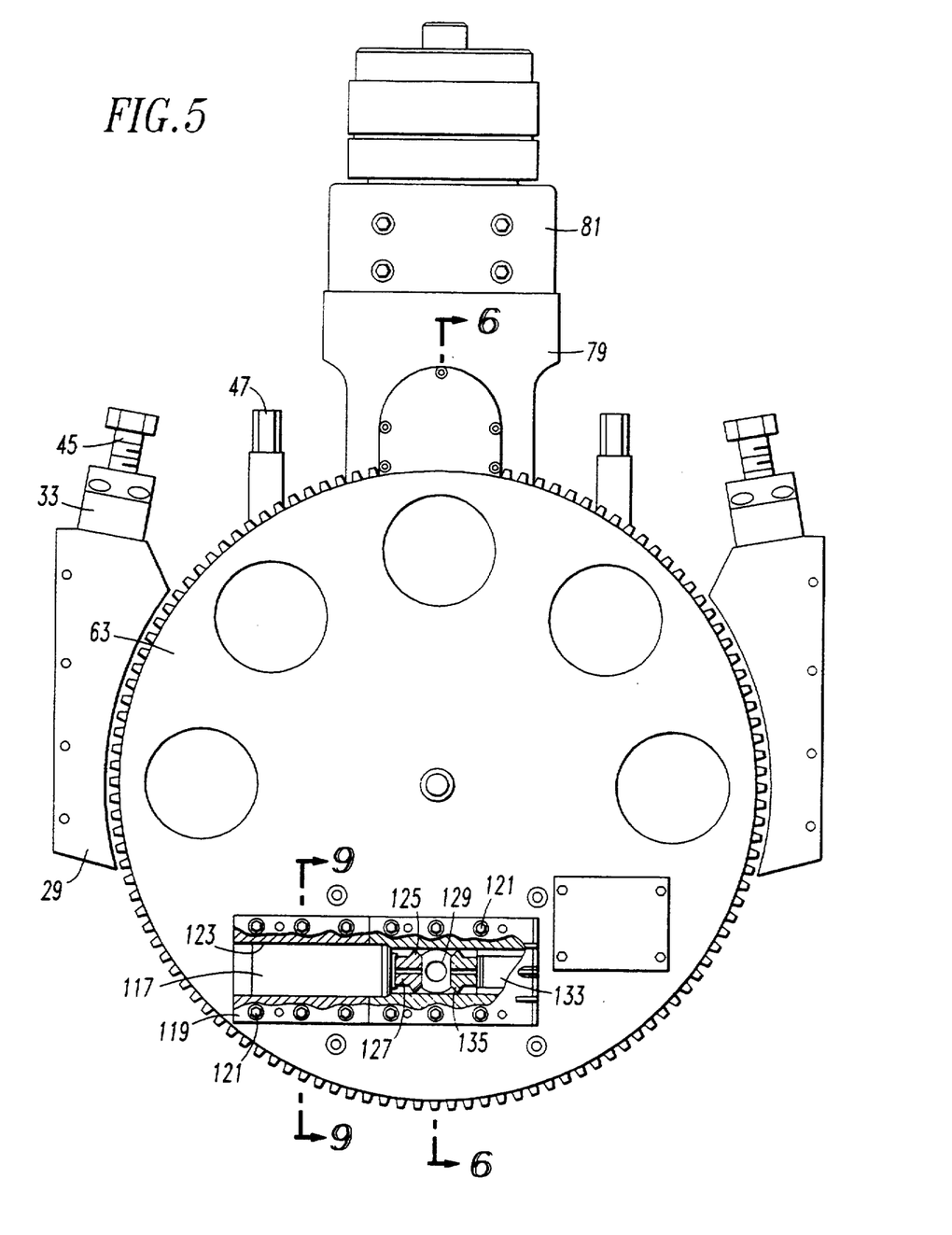
FIG. 5 is a front elevation view with parts removed of the apparatus of the invention.
Figure 6:
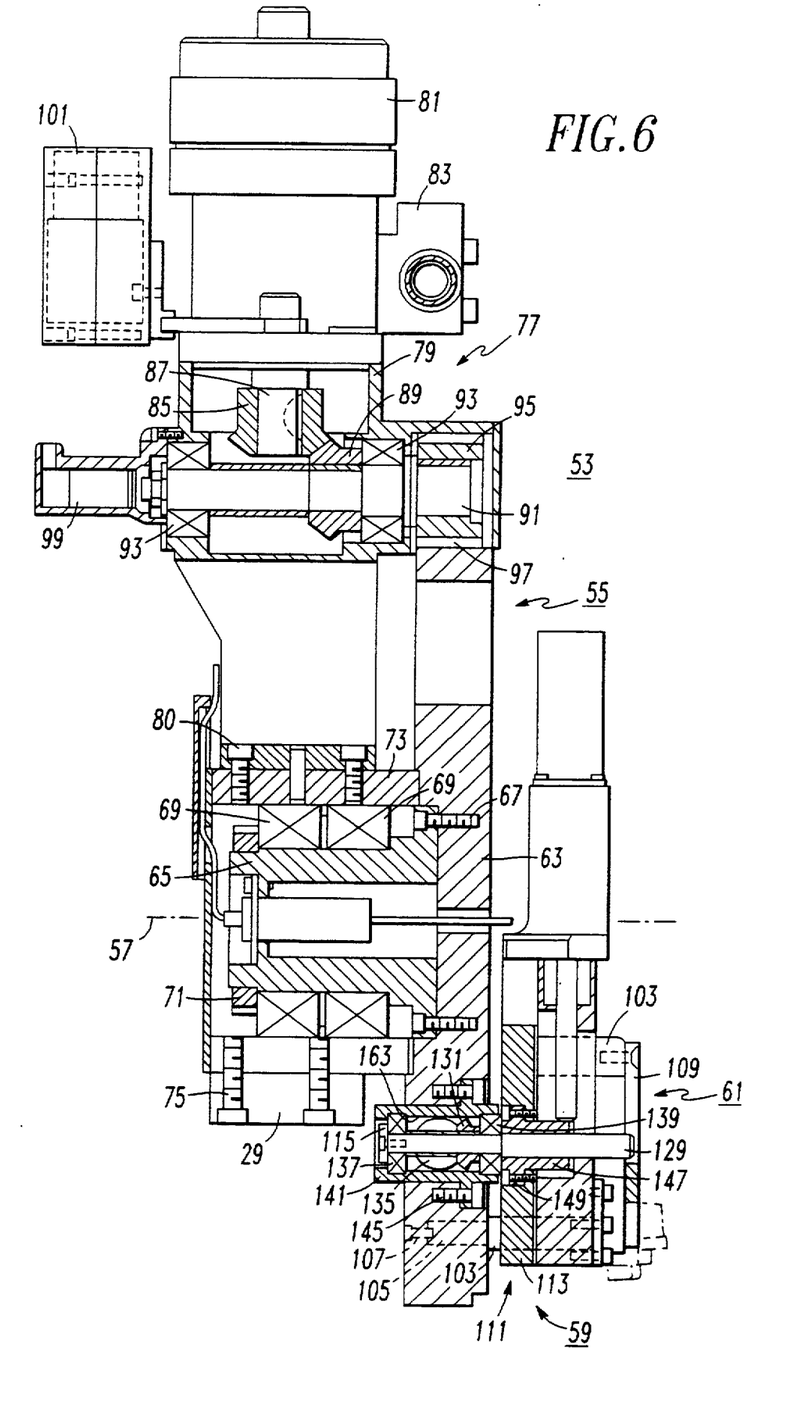
FIG. 6 is vertical section taken along the line 6—6 in FIG. 5.

The second mechanism 59, which moves axially with respect to the first axis 57 includes guide members in the form of four spaced apart guide rods 103 extending laterally from near the periphery of the gear 63. (See FIGS. 6–9). These guide rods 103 have turned down ends 105 which are secured in the gear 63 by bolts 107. The free ends of the guide rods 103 are tied together by an X-brace 109 for rigidity. A carriage 111 is mounted on the guide rods 103. The carriage 111 includes a female slide 113 slidable on the four guide rods 103. The drive assembly 115 for the carriage 111 includes a servo motor 117 supported in the plane of the gear 63 by a housing 119 secured by bolts 121 in an opening 123 in the gear 63 (see FIG. 9). Referring to FIGS. 5 and 6, a bevel gear 125 on the output shaft 127 of the servo motor 117 rotates a screw shaft 129 through engagement with bevel gear 131. A resolver 133 which tracks the position of the carriage 111 is driven through a bevel gear 135 which engages the gear 131. The screw shaft 129 is journaled in a pair of beatings 137, 139 supported in the beating housing 141 secured in an opening 143 in the gear 63 between the four guide rods 103 by bolts 145.

The screw shaft 129 engages a traveling nut 147 secured to the female slide 113 of the carriage 111 by bolts 149 so that rotation of the servo motor 117 drives the carriage 111 axially along the guide rods 103.

The third mechanism 61, which moves radially with respect to the first axis 57, comprises a tool carrier 151. This tool carrier 151 includes a male slide 153 which, as best seen in FIG. 8, slides radially with respect to the first axis 57 and is secured to the female slide 113 by crossed roller beatings 155.

Figure 7:
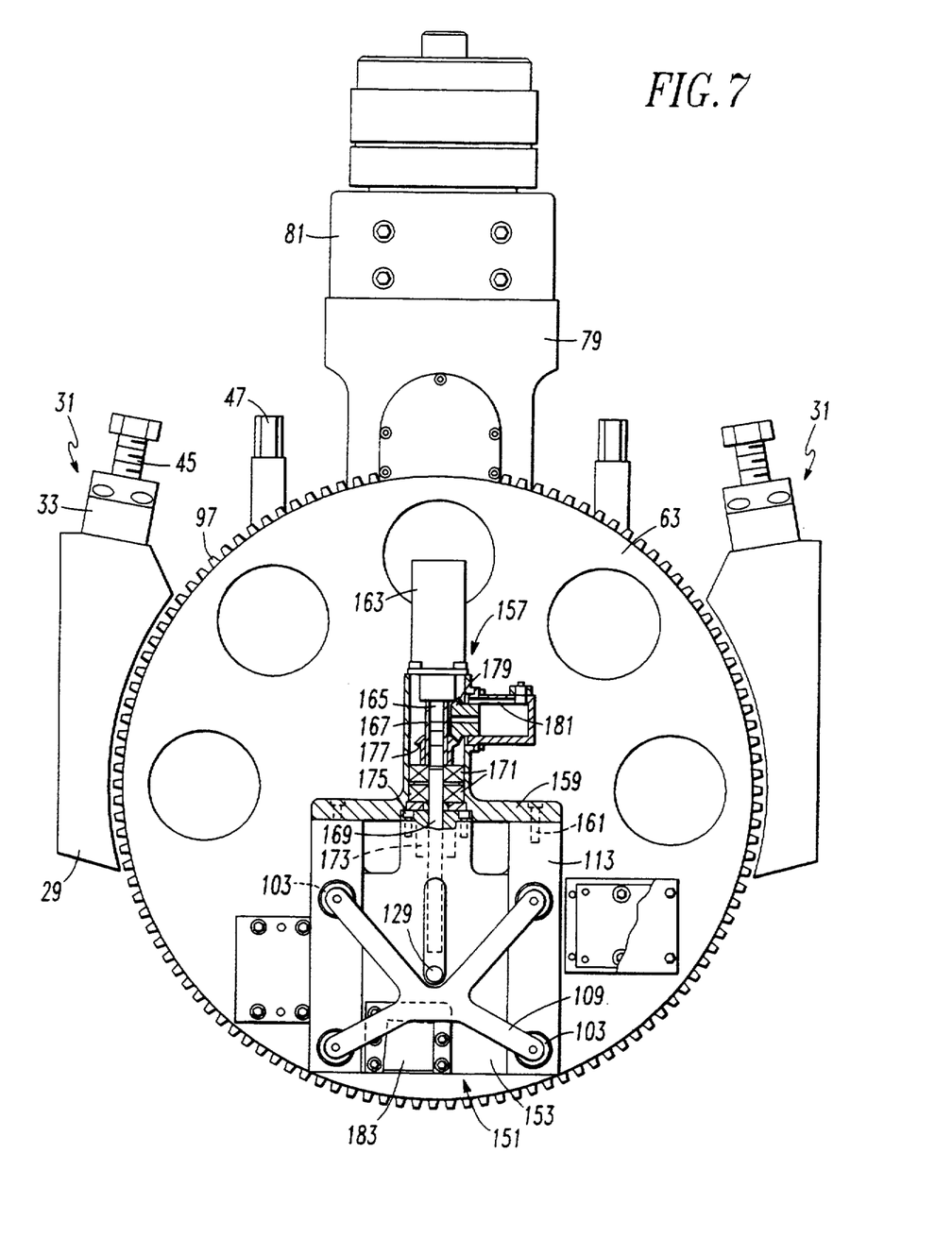
FIG. 7 is a front elevation view of the apparatus with some parts cut away.
Figure 8:
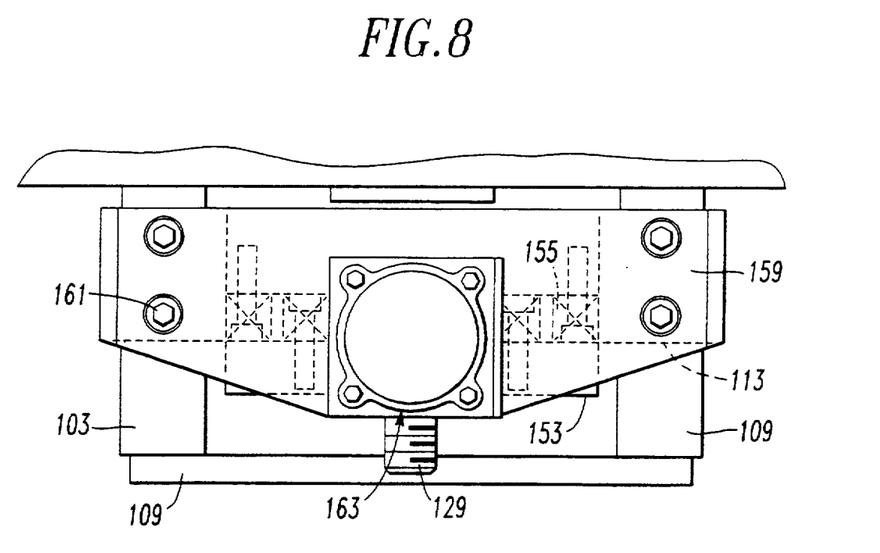
FIG. 8 is a top plan view of a portion of the apparatus shown in FIG. 6 in enlarged scale.
Figure 9:
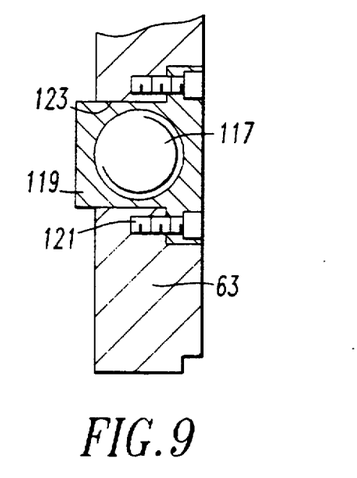
FIG. 9 is a fractional cross-section taken along the line 9—9 in FIG. 5.

Referring to FIGS. 7 and 8, the tool carrier drive assembly 157 includes a feed screw housing 159 secured to the top of the female slide 113 by bolts 161. A feed screw motor 163 is bolted onto the top of the housing 159 with its drive shaft 165 extending down into the housing. A bushing 167 connects the end of the feed screw 169 to the feed screw motor 163. The feed screw 169 is journaled in a pair of tapered roller bearings 171 mounted in the housing 159. The feed screw 169 threadly engages a traveling nut 173 secured to the male slide 153 by bolts 175. Thus, operation of the feed screw motor 163 results in radial motion of the tool carrier 151 relative to the axis 57. A bevel gear 177 rotated with the feed screw 169 engages a bevel gear 179 to rotate the shaft of a resolver 181 which tracks the radial position of the tool carrier 151. A conventional cutting tool 183 is secured to the tool carrier 151.

With the apparatus 27 wedged in position between the guide rails 15 and 17, and vertically aligned by the leveling screws 47, the servo motor 117 can be operated to advance the carriage 111 axially toward the annular valve seat 9. The feed screw motor 163 is operated to radially position the cutting tool 183 with respect to the annular valve seat 9. The hydraulic motor 81 is then operated to rotate the gear 63 and thereby advance the cutting tool around the face of the annular valve seat 9. As the gear 63 rotates the axial advancement of the carriage and radial movement of the tool carrier 151 are coordinated to remove the desired amount of metal. Power and control for the motors 117 and 163 are provided through cable 185 which is connected through slip rings 187 inside the hub 65 to external cable 189.

When machining of the valve seat 9 is completed, the servo motor 117 can be operated to retract the carriage 111 and therefore separate the cutting tool 183 from the valve seat 9 so that the wedges 39 can be released and the cradle can be raised above the guide rails, rotated 180° about a vertical axis and lowered again on the guide rails with the machining device 53 facing the second valve seat 11. The aforementioned offset from the horizontal of the axis 57 results in general alignment of this axis of rotation of the gear 63 with the axis 25 of the valve seat 11. Due to the symmetry of the valve seats, and the fact that alignment of the rotational axis 57 with the axis 25 is not critical, the settings of the leveling screw 47 will most likely will not have to be adjusted. The machining of the annular valve seat 11 is carried out in a manner similar to that described above for the valve seat 9. As mentioned above, after the valve seats are resurfaced with stainless steel, the apparatus 27 can be reinserted into the valve to machine the resurfaced valve seats.

It should be apparent at this point that the apparatus 27 of the invention can easily be installed quickly in a gate valve thereby minimizing radiation exposure of the workers. Once the apparatus 27 is installed, the operation is automatic. A clear advantage of the invention is that the irradiated gate valves can be machined in place, thereby greatly reducing the cost over either replacing the valve or cutting it out and removing it to another area for machining and resurfacing.

While specific embodiments of the invention have been described in detail, it will be appreciated by those skilled in the art that various modifications and alternatives to those details could be developed in fight of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for machining annular valve seats in valve bodies of gate valves having confronting guide means on opposite sides of a chamber in the valve body in front of said annular valve seats and accessible through a lateral opening in the valve body, said apparatus comprising:
   a cradle means inserted through said lateral opening and engaging said confronting guide means; and
   means mounted on said cradle for machining said annular valve seats.

2. The apparatus of claim 1 wherein said confronting guide means comprise a pair of confronting rails on opposite sides of said valve chamber and generally aligned with said lateral opening; and wherein said cradle means includes means sliding on and engaging said rails.

3. The apparatus of claim 2 wherein said cradle means further includes leveling means engaging a bottom of said chamber in said valve body for adjustably setting a height of said cradle means along said rails.

4. The apparatus of claim 3 wherein said leveling means comprises a pair of rods spaced apart on and threadily engaging said cradle means.

5. The apparatus of claim 2 wherein said means sliding on and engaging said rails comprise slides engaging said rails and wedges within said slides wedging outward against said confronting rails.

6. The apparatus of claim 1 wherein said means mounted on said cradle means for machining said valve seats comprises first means rotating about a first axis generally aligned with an axis of said annular valve seat, second means movable axially relative to said annular valve seat and third means movable generally radially relative to said annular valve seat.

7. The apparatus of claim 6 wherein said first means comprises a rotatable member mounted on said cradle means for rotation about said first axis and first motive means rotating said rotatable member about said first axis, wherein said second means comprises guide members extending axially adjacent a periphery of said rotatable member, a carriage mounted on said guide members, and second motive means moving said carriage axially on said guide members, and wherein said third means comprises a slide member on said carriage extending radially with respect to said first axis, a tool carrier slidable on said slide member and third motive means sliding said tool carrier radially on said slide member.

8. The apparatus of claim 7 wherein said rotatable member comprises a gear having peripheral gear teeth and wherein said first motive means comprises a first motor mounted on said cradle means, and gear means driven by said first motor and engaging said peripheral teeth of said gear.

9. A method of machining facing annular valve seats in valve bodies of gate valves having confronting guide means between said annular valve seats on opposite sides of a chamber in the valve body and accessible through a lateral opening in the valve body, said method comprising the steps of;
   installing a cradle in said valve chamber in engagement with said guide means; and
   operating a machining device mounted on one side of said cradle to machine a facing one of said annular valve seats.

10. The method of claims 9 further including:
    lifting said cradle off of said guide means when machining of said one annular valve seat is completed;
    rotating said cradle 180° such that said machining device faces the other annular valve seat;
    reinstalling said cradle in engagement with said guide means with said machining device facing said other annular valve seat; and
    operating said machining device to machine said other annular valve seat.

11. The method of claim 9 wherein said guide means comprise guide rails and said step of installing said cradle comprises sliding said cradle on said guide rails into alignment with said one annular valve seat and wedging outward against said guide rails to lock said cradle in position.

* * * * *